US011587428B2

(12) United States Patent
Stone et al.

(10) Patent No.: US 11,587,428 B2
(45) Date of Patent: Feb. 21, 2023

(54) INCIDENT RESPONSE SYSTEM

(71) Applicant: Johnson Controls Tyco IP Holdings LLP, Milwaukee, WI (US)

(72) Inventors: John A. Stone, Milwaukee, WI (US); Ryan A. Piaskowski, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 75 days.

(21) Appl. No.: 17/197,750

(22) Filed: Mar. 10, 2021

(65) Prior Publication Data

US 2021/0287521 A1  Sep. 16, 2021

Related U.S. Application Data

(60) Provisional application No. 62/988,064, filed on Mar. 11, 2020.

(51) Int. Cl.
*G08B 23/00* (2006.01)
*G08B 27/00* (2006.01)
*G06N 20/00* (2019.01)
*G05B 13/04* (2006.01)
*G05B 13/02* (2006.01)

(52) U.S. Cl.
CPC ......... *G08B 23/00* (2013.01); *G05B 13/0265* (2013.01); *G05B 13/04* (2013.01); *G06N 20/00* (2019.01); *G08B 27/005* (2013.01)

(58) Field of Classification Search
CPC .... G08B 23/00; G08B 27/005; G08B 19/005; G05B 13/0265; G05B 13/04; G05B 2219/25011; G05B 15/02; G06N 20/00; G06N 3/008; G06N 5/02
See application file for complete search history.

(56) References Cited

U.S. PATENT DOCUMENTS

| 10,559,189 | B1* | 2/2020 | Menna | G08B 21/02 |
| 2004/0006694 | A1* | 1/2004 | Heelan | G08B 27/005 |
| | | | | 713/168 |
| 2013/0069543 | A1* | 3/2013 | Mohan | G08B 13/1895 |
| | | | | 250/208.2 |
| 2015/0332266 | A1* | 11/2015 | Friedlander | G06Q 20/401 |
| | | | | 705/75 |

(Continued)

FOREIGN PATENT DOCUMENTS

WO   WO-2018/232147 A1   12/2018

*Primary Examiner* — Curtis J King
(74) *Attorney, Agent, or Firm* — Foley & Lardner LLP

(57) ABSTRACT

Systems and methods for responding to incidents in a building are provided. One method includes performing operations including retrieving data relating to one or more on-premises building devices of the building, determining the incident relating to the one or more on-premises building devices, and determining a plurality of potential responses to the incident. The operations further include analyzing the plurality of potential responses and determining relative risks of the potential responses to the incident and transmitting, to a first on-premises building device of the on-premises building devices, data indicating the incident and at least one of the plurality of potential responses based on the relative risks of the potential responses.

20 Claims, 8 Drawing Sheets

(56) References Cited

U.S. PATENT DOCUMENTS

| | | | |
|---|---|---|---|
| 2016/0087927 A1* | 3/2016 | Crudele | H04L 51/222 |
| | | | 709/206 |
| 2017/0365151 A1* | 12/2017 | Burleson | G08B 25/10 |
| 2018/0157902 A1* | 6/2018 | Tu | G06N 3/049 |
| 2018/0275625 A1 | 9/2018 | Park et al. | |
| 2019/0017719 A1 | 1/2019 | Sinha et al. | |
| 2019/0158309 A1 | 5/2019 | Park et al. | |
| 2019/0214153 A1* | 7/2019 | Avitan | G08B 21/0269 |
| 2019/0295207 A1* | 9/2019 | Day | G08B 21/02 |
| 2020/0057953 A1* | 2/2020 | Livny | H04L 41/0654 |
| 2020/0104851 A1* | 4/2020 | Agarwal | G06V 40/171 |
| 2020/0226490 A1* | 7/2020 | Abdulaal | G06N 7/005 |
| 2021/0191349 A1* | 6/2021 | Nemeth | G08B 25/08 |
| 2021/0274591 A1* | 9/2021 | Norcross | H04H 20/59 |
| 2022/0014895 A1* | 1/2022 | Horelik | G08B 21/0261 |
| 2022/0027856 A1* | 1/2022 | Piaskowski | G06Q 10/105 |
| 2022/0201455 A1* | 6/2022 | Tierney | G06Q 50/01 |

\* cited by examiner

INCIDENT RESPONSE SYSTEM

CROSS-REFERENCE TO RELATED APPLICATIONS

The present application claims priority to and the benefit of U.S. Provisional Patent Application No. 62/988,064, filed Mar. 11, 2020, which is incorporated herein by reference in its entirety.

BACKGROUND

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof.

SUMMARY

One embodiment of the present disclosure relates to a method of providing on-premises response to an incident in a building. The method includes retrieving, by one or more off-premises processing circuits, data relating to one or more on-premises building devices of the building, determining, by the one or more off-premises processing circuits, the incident relating to the one or more on-premises building devices, and determining, by the one or more off-premises processing circuits, a plurality of potential responses to the incident. The method further includes analyzing, by the one or more off-premises processing circuits using the data, the plurality of potential responses and determining relative risks of the potential responses to the incident and transmitting, by the one or more off-premises processing circuit to a first on-premises building device of the on-premises building devices, data indicating the incident and at least one of the plurality of potential responses based on the relative risks of the potential responses.

Another embodiment relates to a system for providing on-premises response to an incident in a building. The system includes one or more computer-readable storage media having instructions stored thereon and one or more off-premises processing circuits configured to execute the instructions to perform operations. The operations include retrieving data relating to one or more on-premises building devices of the building, determining the incident relating to the one or more on-premises building devices, and determining a plurality of potential responses to the incident. The operations further include analyzing the plurality of potential responses and determining relative risks of the potential responses to the incident and transmitting, to a first on-premises building device of the on-premises building devices, data indicating the incident and at least one of the plurality of potential responses based on the relative risks of the potential responses.

Another embodiment relates to one or more computer-readable storage media having instructions stored thereon that, upon execution by one or more processing circuits, cause the one or more processing circuits to perform operations. The operations include retrieving data relating to one or more on-premises building devices of the building, determining the incident relating to the one or more on-premises building devices, and determining a plurality of potential responses to the incident. The operations further include analyzing the plurality of potential responses and determining relative risks of the potential responses to the incident and transmitting, to a first on-premises building device of the on-premises building devices, data indicating the incident and at least one of the plurality of potential responses based on the relative risks of the potential responses.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Overview

Figure 1A:
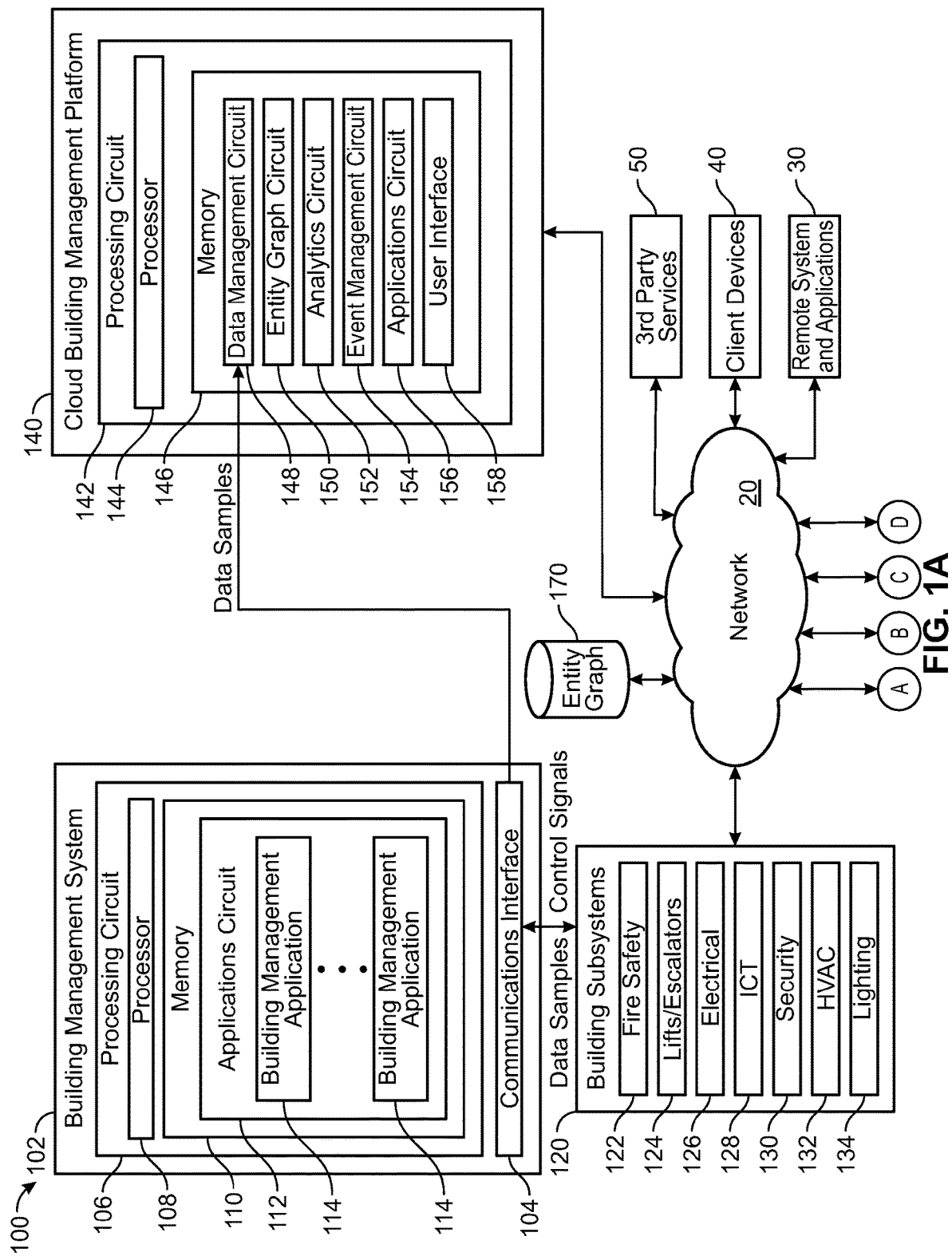
FIG. 1A is a block diagram of a smart building environment, according to an exemplary embodiment.

Referring generally to the FIGURES, systems and methods for an incident response system are shown, according to various exemplary embodiments. The incident response system is configured to retrieve data relating to on-premises building devices for one or more building sites. In some embodiments, based on the received data, the incident response system is configured to determine one or more potential incidents relating to the on-premises building devices. For example, the incident response system is configured to determine that there is a risk of an incident of a fire starting at the building with the on-premises devices. As another example, the incident response system is configured to determine a potential incident of an active threat in the building. The incident response system may then be configured to determine at least one potential response for each potential incident simulated by the incident response system. In some embodiments, the incident response system is configured to analyze each of the potential responses and determine relative risks of each of the potential responses to a potential incident. For example, the incident response system may determine that instructing assets to relocate to a certain room or area of a building during an incident of a tornado increases the relative risks of that potential response. The incident response system may then be configured to transmit data indicating the potential incidents and at least one of the potential responses to at least one on-premises building device. In some embodiments, the incident response system selects a potential response to transmit to the on-premises building devices based on the relative risks of the potential responses. For example, the incident response system may be configured to transmit one response with the lowest associated risk to an on-premises building device.

In some applications, models of incidents and responses may exist in cloud networks and large data centers, analyzed by teams of data scientists to extract meaningful information and interpret the data. However, such systems require a vast amount of data, time, and computer processing power to support these functions. Due to this need for a large amount of processing power, time, and data, the simulated incidents and responses to the incidents are not available to devices (e.g., on-premises devices) at sites soon enough to provide optimal responses to a developing incident. Further, impacted buildings may not have the necessary access to electrical power, network availability, and/or network bandwidth needed to model alternative responses to various incidents and/or received such models from off-premises (e.g., cloud/data center) devices. In particular, incidents that develop rapidly, that are impacted by constantly changing internal and/or external parameters, and/or that include constantly changing responses to the incident, do not allow sufficient time, computer resources, or knowledge to fully take advantage of the benefits of modeling potential incidents and responses to incident scenarios.

The implementation of digital analytic response twins (DARTs) with an off-premises (e.g., cloud-based) network can allow the generation and transmission of real-time, artificial intelligence (AI) based responses as incidents begin to develop. The incident response system and DARTs described herein may proactively model potential incidents and possible responses to instruct a building management system to take corrective actions in order to resolve the incident. Thus, optimal responses to an incident may be implemented more immediately after the development of an incident. As such, the incident may be resolved before the incident may have a significant impact on a building site and/or other entities (e.g., people, equipment, areas of a building, etc.) of the site.

Figure 1B:
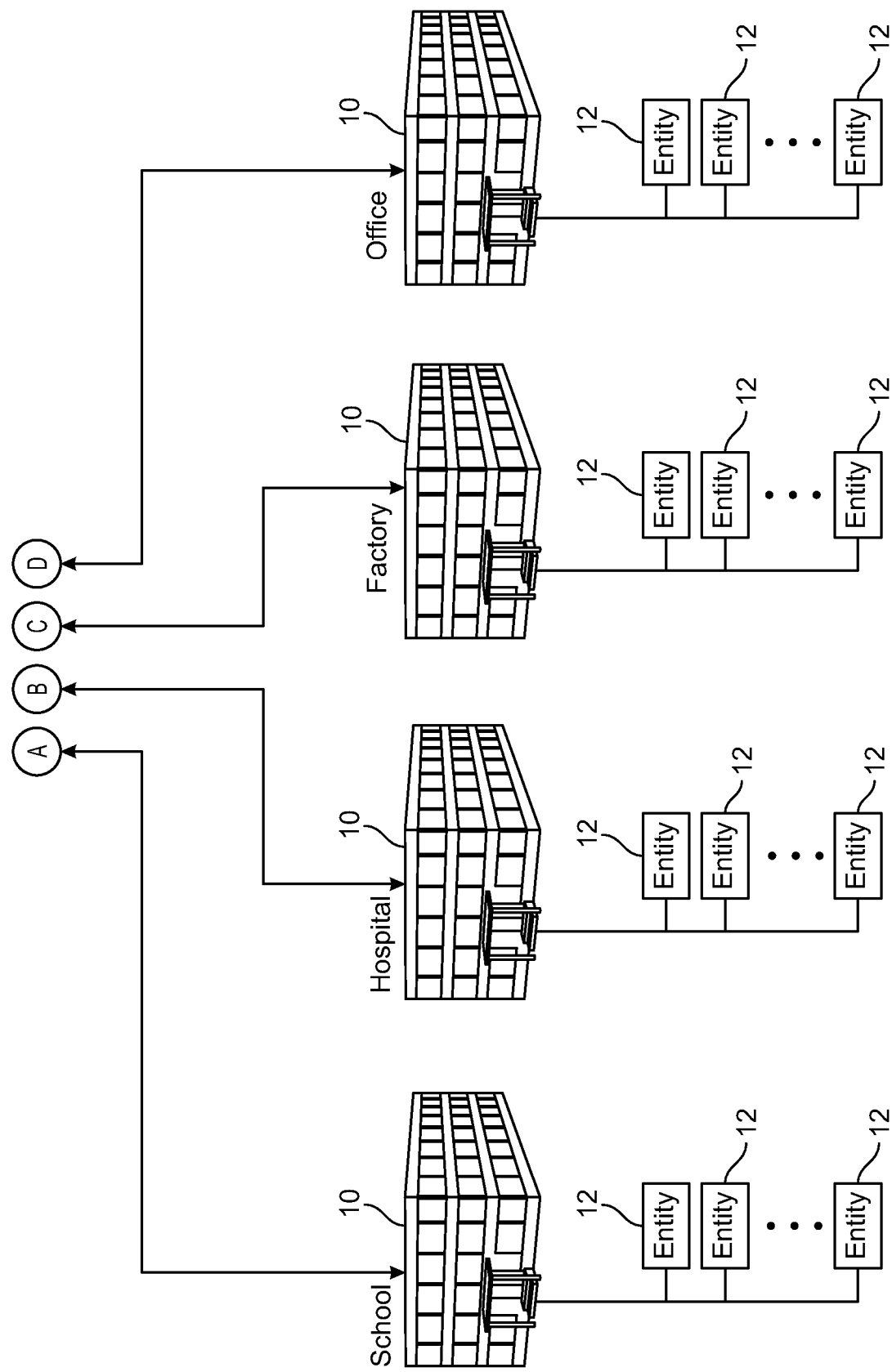
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. While the building management platform 140 is described as a cloud building management platform herein, other off-premises computing systems may also be used outside of a "cloud" system with the building management platform 140, according to some embodiments. For example, the building management platform 140 and other computing devices described herein may be a part of a computing system that includes a single off-premises server, several off-premises servers, and/or other edge devices of the computing system. Cloud building management platform 140 may be configured to collect information from a variety of different data sources. Cloud building management platform 140 may create digital representations, referred to as "digital twins," of physical spaces, equipment, people, and/or events based on the collected information. In some embodiments, the generation of digital twins can, additionally or alternatively, be done in edge devices of the network environment. In various embodiments, the digital representations are stored in an entity graph. In other embodiments, the digital representations may be stored in another type of document database (e.g., an Oracle relational database, a MongoDB document database, and so on).

In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between a variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference in their entireties.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, applications, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiments, each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments, BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a person. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc.). For example, user interface 158 may facilitate chatbot interaction, voice commands, user authentication, biometric feedback, or the like.

Figure 2:
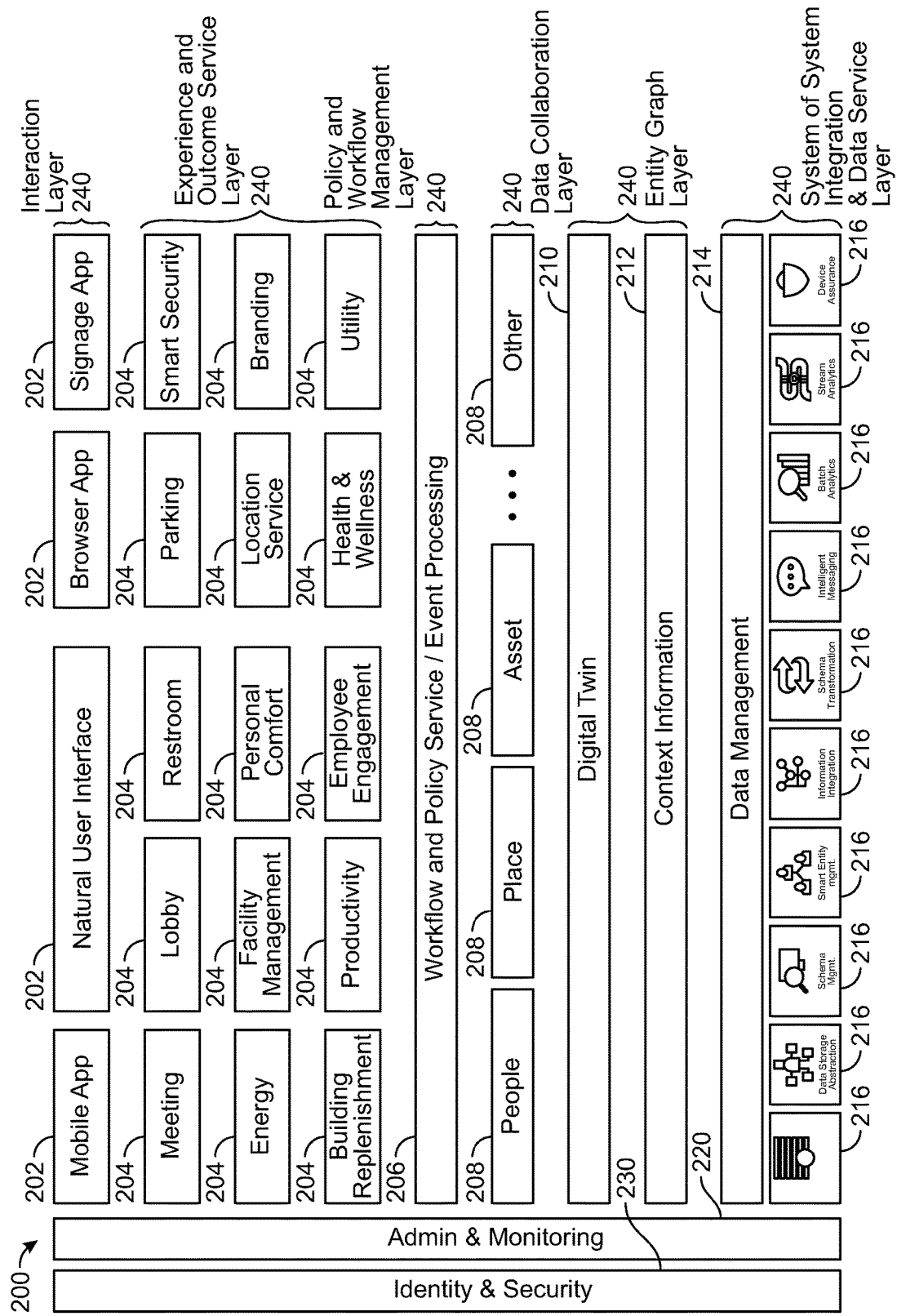
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.). In other embodiments, data source(s) 208 represent heterogeneous source data schema as an open source common data model, such as Haystack or a proprietary schema.

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active computing process. For example, a digital twin 210 may communicate with other digital twins 210, to sense, predict, and act. In various embodiments, digital twin 210 is generated dynamically. For example, a digital twin 210 corresponding to a conference room may update its status by looking at occupancy sensors or an electronic calendar (e.g., to turn its status "available" if there is a no show for a scheduled meeting, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
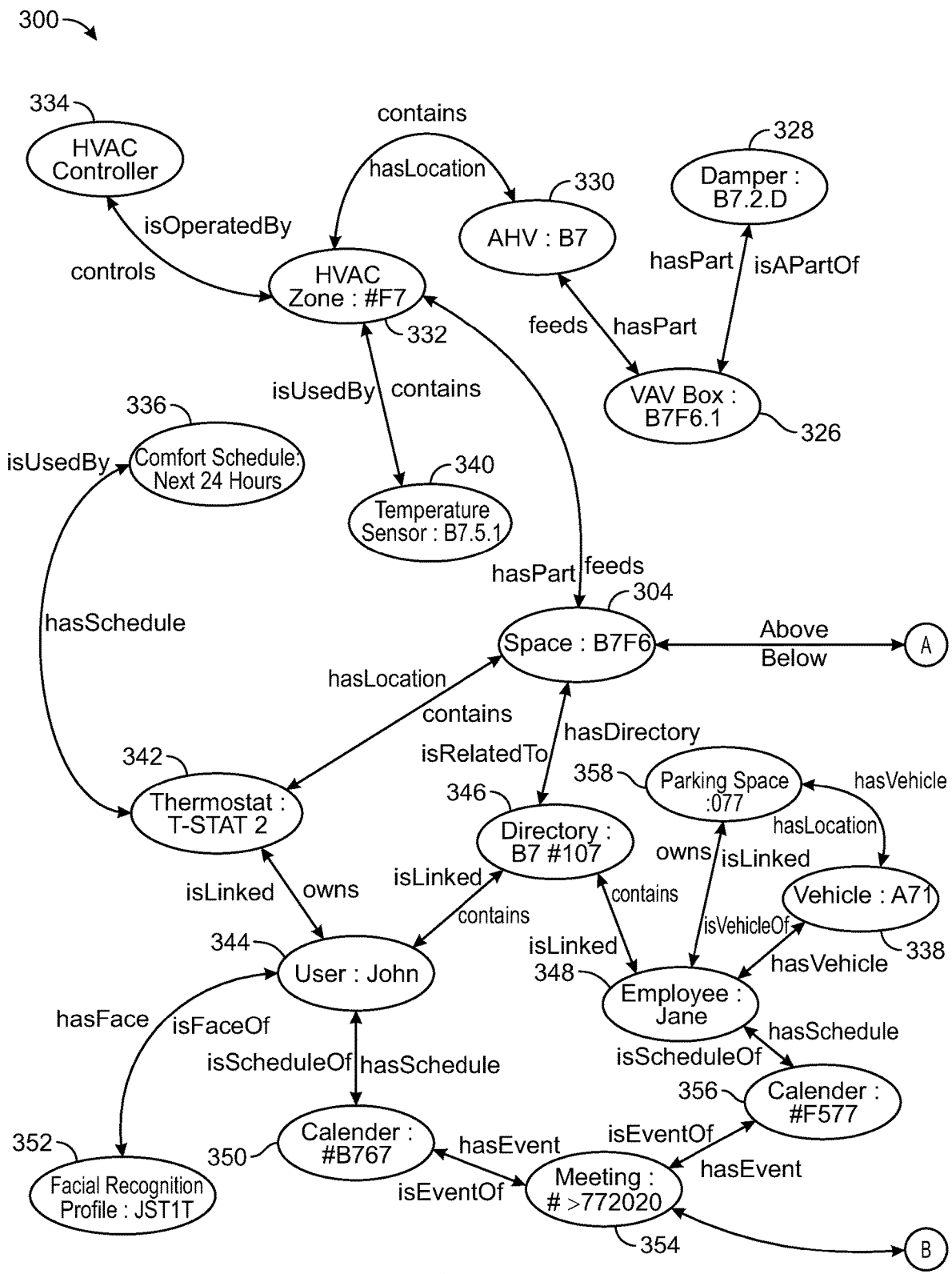
FIG. 3A is a block diagram of an entity graph, according to an exemplary embodiment.
Figure 3B:
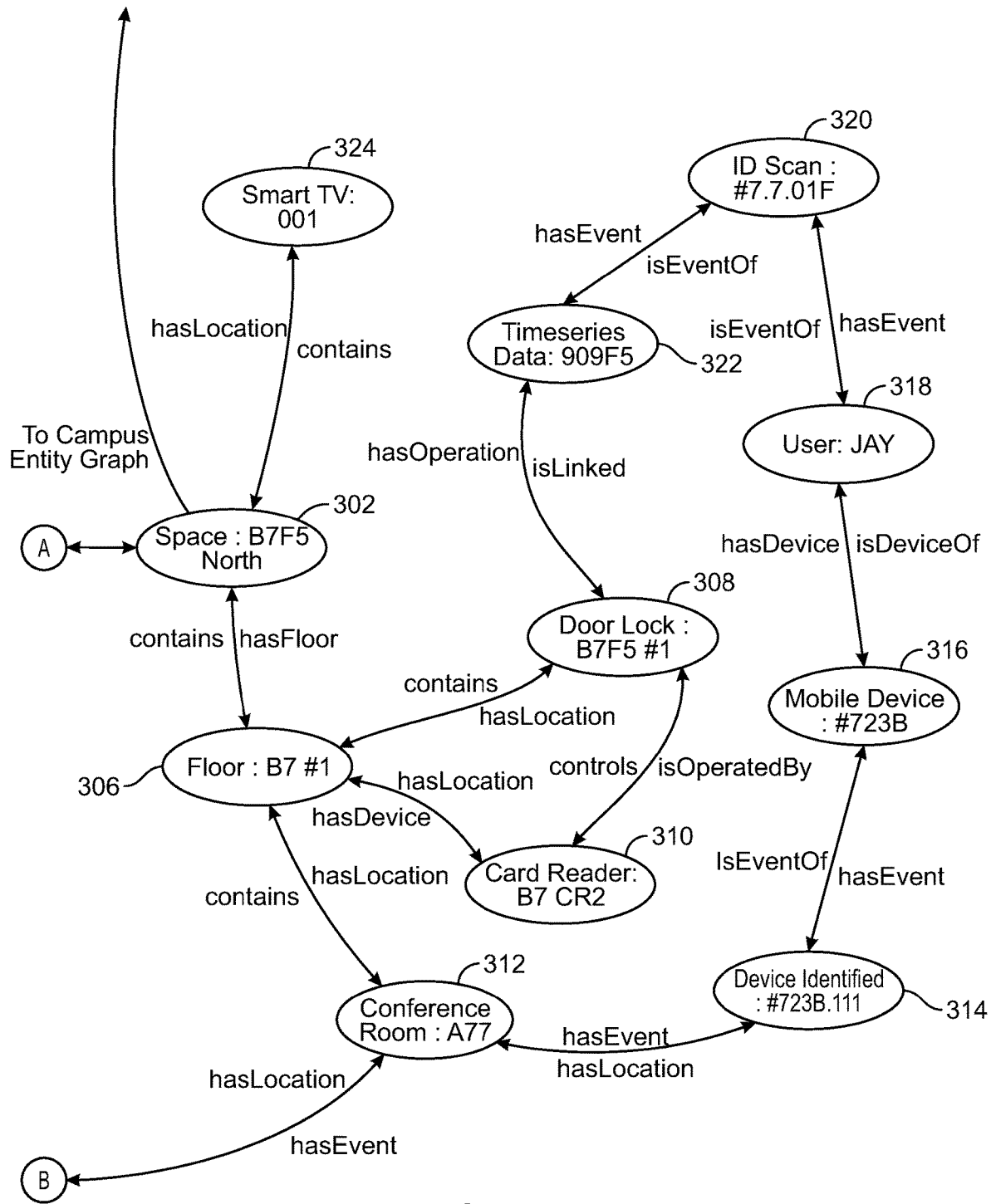
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships between entities. While the nodes represent the building and its components, the edges describe how the building operates. The nodes and edges together can create an overall digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayered system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in this office) these applications may never reach full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data is received and ingested into entity graph 300. For example, cloud building management platform 140 is configured to identify a door lock and card reader and generate a number of nodes and edges in entity graph 300 representing the card reader controller operation of the door lock.

Digital Twin-Based Incident Response

Short delays in corrective actions to incidents can be extremely costly to building premises. For example, a fire at a site, such as an office building, a gas station, a retail store, a clinic, a kiosk, an automatic teller machine (ATM), etc., can quickly destroy expensive assets, some of which may not be replaceable. In some embodiments, incidents are related to wearable devices, such as sensors in helmets, gloves, and/or shoes worn by workers. These sensors can continuously measure distance from high-risk places and require immediate response to an incident. For example, an incident may include a sensor detecting that the measured distance from a high-risk place is lower than a predetermined safety threshold. As a further example, a device at a site may include a medical device, such as an intensive care unit (ICU) bedside monitor, a ventilator, a cardiac monitor, an implanted medical device, etc. These medical devices can be imperative to maintaining a stable condition for patients and can require an immediate response in the case of an incident, such as device failure or malfunction, power outage, etc.

In yet another additional example, a device (e.g., a router) positioned in buoys above off-shore oil wells may respond to acoustic signatures of leaks in the oil well. An incident of a leak in an oil well can cause loss of production, safety issues, and severe environmental threats to the surrounding area. Therefore, corrective actions for an incident of a leak can mitigate more of the negative effects of the incident the sooner the actions are implemented to resolve the incident. In some embodiments, a response to an incident that is associated with the least amount of risk is not a clear response. In other embodiments, the fact that a response is needed may not be obvious. This may especially be exacerbated in cases with risk assessment that involves correlation of data from several internal and external sources.

The application of DARTs with an off-premises incident response system can permit the simulation and transmission of real-time potential responses as incidents start to occur. The incident response system described herein can model potential incidents and potential responses to resolve the incident, before the incident even begins developing. As such, optimal responses to an incident can be executed more quickly after a real incident begins to develop. Therefore, an incident may be resolved sooner, decreasing the risk of the incident having a substantial effect on a building site and/or other entities (e.g., people, equipment, areas of a building, etc.) on-premises. For example, the sooner the incident is resolved with a response, the lower the amount of risk of damage to entities, which may be extremely costly and/or irreplaceable, on-site.

Figure 4:
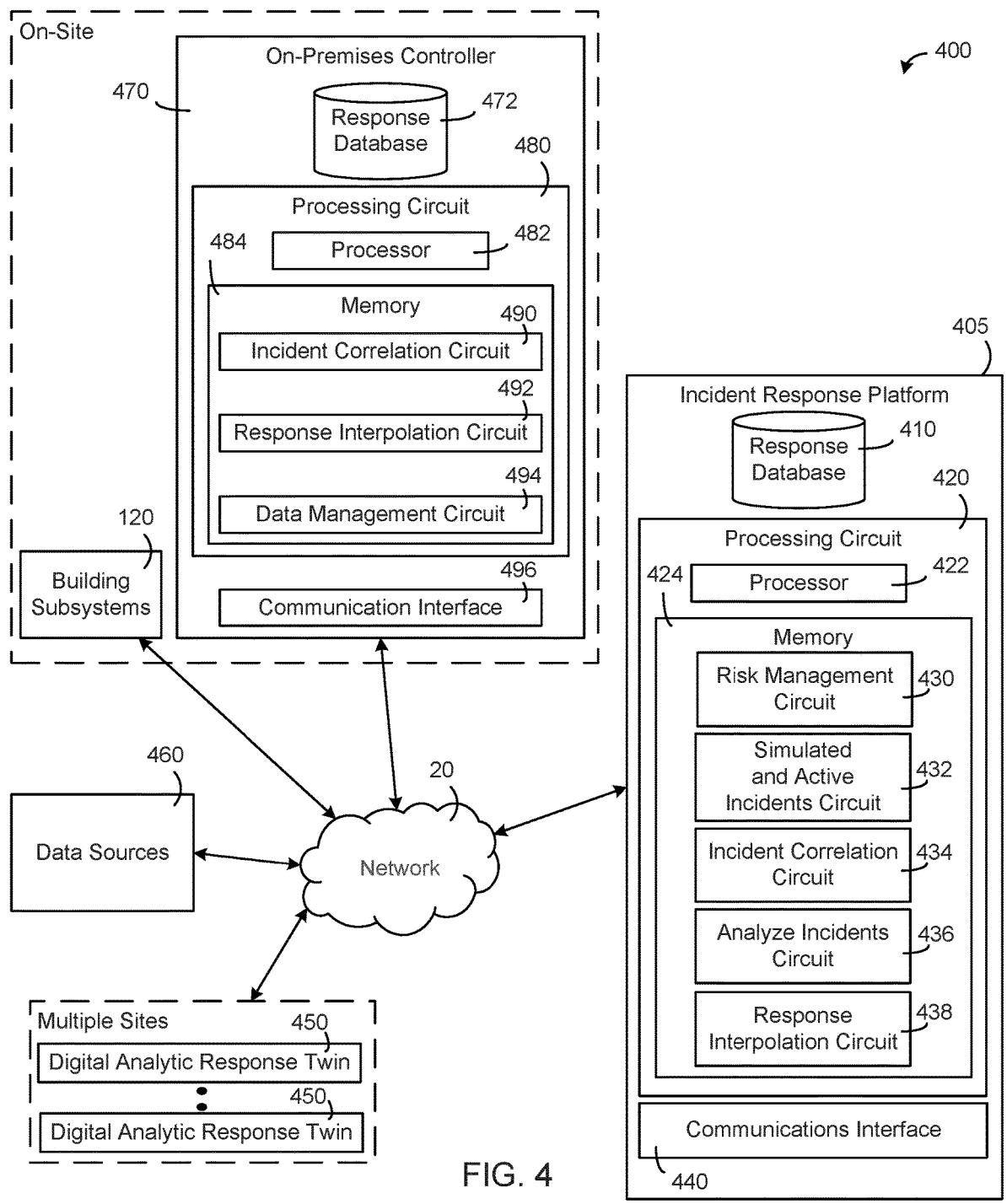
FIG. 4 is a block diagram of a cloud-based incident response system, according to an exemplary embodiment.

Referring now to FIG. 4, an incident response modeling system including incident response system 400 is shown, according to an exemplary embodiment. In some embodiments, the incident response system 400 is configured to determine and analyze various potential incidents of a building, building device, and other building assets. For example, incident response system 400 is configured to receive information from numerous digital analytic response twins (DARTs) 450 at various premises and simulate possible incidents that may arise. In various embodiments, incident response system 400 includes off-premises incident response platform 405, on-premises controller 470, data sources 460, various DARTs 450, and building subsystem 120 associated with the on-premises controller 470.

Off-premises incident response platform 405 includes response database 410, processing circuit 420, and communications interface 440. Communications interface 440 is configured to facilitate communication between the off-premises incident response platform 405 and external systems. For example, communications interface 440 may facilitate communication between off-premises incident response platform 405 and several on-premises controllers 470, building subsystems 120, data sources 406, etc. In some embodiments, communications interface 440 is similar to communications interface 104 described above with reference to FIG. 1A. Response database 410 is configured to store information associated with off-premises incident response platform 405. For example, the off-premises incident response platform 405 may determine a potential response to a simulated incident for a building and store the potential response and associated information in response database 410. Response database 410 may be internal storage or external storage. In some embodiments, response database 410 is internal storage with relation to off-premises incident response platform 405, and/or may include a remote database, cloud-based data hosting, or other remote data storage.

Processing circuit 420 includes processor 422 and memory 424. In some embodiments, off-premises incident response platform 405 includes one or more processing circuits 420 including one or more processors 422 and one or more memories 424. Each of the processors 422 can be a general purpose or specific purpose processor, an application specific integrated circuit (ASIC), one or more field programmable gate arrays (FPGAs), a group of processing components, or other suitable processing components. Each of the processors 422 is configured to execute computer code or instructions stored in memory 424 or received from other computer readable media (e.g., CDROM, network storage, a remote server, etc.).

Memory 424 may include one or more devices (e.g., memory units, memory devices, storage devices, or other computer-readable media) for storing data and/or computer code for completing and/or facilitating the various processes described in the present disclosure. Memory 424 may include random access memory (RAM), read-only memory (ROM), hard drive storage, temporary storage, non-volatile memory, flash memory, optical memory, or any other suitable memory for storing software objects and/or computer instructions. Memory 424 may include database components, object code components, script components, or any other type of information structure for supporting the various activities and information structures described in the present disclosure. Memory 424 may be communicably connected to processor(s) 422 via processing circuit 420 and may include computer code for executing (e.g., by processor 422) one or more processes described herein.

Memory 424 includes risk management circuit 430, simulated and active incidents circuit 432, incident correlation circuit 434, incident analytics circuit 436, and response interpolation circuit 438. Risk management circuit 430 can be configured to manage parameters associated with various, potential risks to entities of a building. For example, risk management circuit 430 may update a set of risks for a particular entity (e.g., person, building device, etc.) on-site, such as device failure, compromised data from hacking, fires, tornadoes, etc. In various embodiments, risk management circuit 430 is configured to receive input from external data sources 460 (e.g., a client user device, third party data sources, etc.) on which risk factors are a greater threat to entities than other factors. For example, the risk management circuit 430 may receive, via the network 20, an instruction from a client that owns a building that greatly values data security, such as a hospital, that compromised data is the greatest risk factor. As such, the risk management circuit 430 may be configured to weigh more heavily the risk of compromised data while evaluating risk scores for various potential incidents. In some embodiments, the risk management circuit 430 is configured to output the various risk parameters and associated weight on the determination of an overall risk to the incident analytics circuit 436. The risk management circuit 430 may send the incident analytics circuit 436 information that a client has greater concern over one risk factor than the other risk factor. The incident analytics circuit 436 may then utilize this data in determining a response associated with the lowest relative risk to a potential incident on building premises.

Simulated and active incidents circuit 432 is configured to determine incidents to entities (e.g., a person, a building, a building device, etc.), such as potential incidents, developing incidents, and/or active incidents. An incident can be any possible event that may cause harm or create risks for an entity. For example, an incident may include a breaking and entering, a robbery, a fire, a tornado, hacking of the network of a building, failure of a building subsystem (e.g., fire system, security system, etc.), malfunctioning of an entity (e.g., building device outputting a temperature that is off by greater than a threshold amount, ID scanner for entry malfunctioning, etc.). In some embodiments, the simulated and active incidents circuit 432 retrieves data from various DARTs 450 associated with numerous building premises (i.e., sites) of various building entities, systems, services, etc. The simulated and active incidents circuit 432 may also receive information from several external sources. For example, the simulated and active incidents circuit 432 retrieves data from a news website to obtain knowledge of the weather forecast where an entity is located. Thus, the simulated and active incidents circuit 432 can determine whether a risk factor that is related to weather (e.g., a risk of fire, tornado, hail, etc.) has a certain probability of occurrence. The simulated and active incidents circuit 432 also receives data from the risk management circuit 430 to receive data on the various potential risk parameters associated with an entity. In some embodiments, the simulated and active incidents circuit 432 generates any potential incident with an associated risk score above a predetermined, particular threshold. In other embodiments, the simulated and active incidents circuit 432 is configured to generate a certain number of potential incidents, such as ten potential incidents that are the most likely to occur, or a number of potential incidents that have the highest associated relative risk.

In some embodiments, incident correlation circuit 434 is configured to analyze which data received by the simulated and active incidents circuit 432 was utilized in generating a particular incident and correlating the information with the particular incident. In various embodiments, the incident correlation circuit 490 is configured to associate a connection between external and internal parameters that are linked with an incident event and an entity (e.g., an on-premises building device). For example, the incident correlation circuit 434 may relate a temperature sensor reading over a predetermined threshold with a certain probability of indicating an incident of fire.

Incident analytics circuit 436 is configured to evaluate the predicted, potential incidents to generate several potential responses that may resolve the incident and/or reduce the damage and risk to entities that may be affected by the incident. For example, incident analytics circuit 436 determines several possible responses to each potential incident generated by simulated and active incidents circuit 432 to mitigate potential harm to building assets. In some embodiments, the incident analytics circuit 436 continuously creates simulated responses to incidents based on updated data received from simulated and active incidents circuit 432 and risk management circuit 430. In various embodiments, the incident analytics circuit 436 generates potential responses to the possible simulated incidents at preset time intervals. The incident analytics circuit 436 may model new potential responses to a potential incident to an entity associated with a greater value (e.g., monetary cost, importance to client, etc.) at a quicker rate than to potential incidents to other entities. For example, the incident analytics circuit 436 may generate potential responses to incidents to an intensive care unit hospital room more often than generating potential responses to possible incidents to a storage area for excess inventory products.

The incident analytics circuit 436 may also be configured to determine relative risks associated with the potential responses for each potential incident. In some embodiments, the incident analytics circuit 436 is configured to utilize artificial intelligence and machine-learning models to evaluate the potential responses and relative risks of each potential response. As such, the incident analytics circuit 436 can determine a potential response that is associated with a lowest risk to various entities. For example, each potential response generated by the incident analytics circuit 436 may be paired with a predicted risk score. In some embodiments, the risk score is a numeric value, with a higher numeric value indicating a higher predicted risk. In other embodiments, the risk score may be a range or relative value in comparison to the other generated risk scores. For example, the potential incidents may be associated with a risk that is ranked in comparison to the associated risks of the other simulated, potential incidents. The incident analytics circuit 436 may be configured to update the response database 410 with the potential response associated with the lowest relative risk. For example, as updated data is received from various sources (e.g., data sources 460), an updated potential response may be associated with a lower risk than a previously determined potential response. In some embodiments, the incident analytics circuit 436 is configured to transmit a signal to the off-premises incident response platform 405 to transmit, via the communications interface 440, the potential responses to each of several potential incidents to a first on-premises building device (e.g., on-premises controller 470). For example, the off-premises incident response platform 405 may continuously synchronize with one or more on-premises building devices to communicate information on an optimal incident response. In some embodiments, the "optimal" incident response is determined by receiving user selections (e.g., from client devices) on preferences for handling certain incident events.

Still referring to FIG. 4, the response interpolation circuit 438 is configured to retrieve information from the response database 410 regarding the potential responses to a potential incident with the lowest relative risks. In some embodiments, the response interpolation circuit 438 is configured to estimate controls necessary to implement a potential response based on known responses that were executed in previous control actions. For example, response interpolation circuit 438 determines a duration of operating sprinklers in a fire system and evacuation plan for entities (e.g. employees) of a building based on previous responses to past fire incidents. As such, the response interpolation circuit 438 can be configured to determine an optimal response implementation plan for one of the building devices and/or building subsystems 120 to execute. In some embodiments, the response interpolation circuit 438 is configured to extrapolate outcomes of one or more potential responses to determine various control actions for implementing a response to a potential incident with the least amount of possible risks involved to entities of the building.

The incident response system 400 includes various digital analytic response twins (DARTs) 450. The DARTs 450 may be similar to the digital twins 210. In some embodiments, each DART 450 is a digital representation of an individual building site. For example, a DART 450 is a digital representation of a hospital site. In various embodiments, the DARTs 450 are stored in an entity graph, such as entity graph 300 of FIG. 3A. In some embodiments, a single site may include several DARTs 450 that represent an entity of the building site. For example, a DART 450 may be a digital representation of a main meeting room within an office building, an owner of a company that works at the building site, a piece of equipment, a server, and so on. The DARTs 450 are on-premises (i.e., on-site) and network (e.g., cloud-based) digital representations of various sites (e.g., office buildings, refineries, stores, stadiums, hospitals, parking structures, etc.). The DARTs 450 are digital representations that may implement modeling and analyzing of various responses, by communicating with off-premises incident response platform 405, to different classes and/or levels of potential incidents. The DARTs 450 may also model and analyze, via communication with off-premises incident response platform 405, correlation of data from multiple internal and external data sources 460 to particular incident events and potential responses.

In some embodiments, clients can control the digital representations of the various entities in incident response system 400 to determine how a DART 450 of a building responds to the different classes of potential incidents. For example, a client, via a user device of the client, can enable the various DARTs 450 to select a potential response associated with a lowest, relative risk to each of the potential incidents. Further, DARTs 450 may be configured to store, and continuously update, a potential response with a lowest associated risk level for various combinations and permutations of potential incident events. The DARTs 450 can also be configured to update incident-related correlations of data from several sources in an entity graph (e.g., entity graph 300). For example, the DARTs 450 can update a database of entity relationships for the entity graph. As such, an optimal response to a developing incident can be accessed immediately and used as soon as a component of a building system (e.g., BMS 102, off-premises incident response platform 405) detects the real incident event.

Data sources 460 may include both internal and external data sources from the incident response system 400. For example, data sources 460 may include internal data sources such as various building devices (e.g., equipment of the building subsystems 120) and other building systems (e.g., BMS 102). The internal data sources may provide information on parameters such as building occupancy, available backup power for a building, fault data of the building equipment, and the like. External data sources may include user devices (e.g., client devices 40), third party services (e.g., third party services 50), remote systems (e.g., remote systems and applications 30), and so on. These external data sources may provide information regarding parameters such as weather, threat levels, traffic (e.g., highway traffic, shipping traffic, etc.), geological events, timing of events, and so on. For example, data received from a social media website may indicate that a rally is going to occur at a building site when the building opens at 8:00 A.M. The data sources 460 may transmit updated information to the off-premises incident response platform 405, via the network 20, as internal and external parameters are updated. As such, the off-premises incident response platform 405 can model potential incidents and responses to resolve the potential incidents based on the most recent parameters that may affect the incident and outcome of a response as they constantly change. For example, if traffic to access a particular parking lot of a building site is heavily backed up, a response may be modeled to direct emergency services to a different route. A different exit door may then be accessed to respond to an incident of an employee on premise suffering a severe medical condition (e.g., heart attack, seizure, loss of consciousness, allergic reaction, etc.).

Incident response system 400 includes an on-premises controller 470. In some embodiments, the on-premises controller 470 is on-site at a location. For example, the on-premises controller 470 is located at a building site, at a kiosk, a gas station, in a retail store, and so on. In some embodiments, the on-premises controller 470 communicates via the communications interface 496 with one or more building subsystems 120. For example, the on-premises controller 470 receives information from a fire safety subsystem 122 indicating an incident of a fire developing. As a further example, the on-premises controller 470 receives information, via the network 20, from the security subsystems 130 that an incident of an unexpected visitor at a building, identified as a threat, has been detected.

The on-premises controller 470 may be incorporated with other building devices at the site. For example, the on-premises controller 470 may be integrated with a server in the security subsystem 130. The on-premises controller 470 includes a response database 472, a processing circuit 480, and a communications interface 496. Communications interface 496 is configured to facilitate communication between the on-premises controller 470 and other components of the incident response system 400, such as off-premises incident response platform 405, data sources 460, and several DARTs 450. In some embodiments, communications interface 496 is similar to communications interface 104 described above with reference to FIG. 1A. The processing circuit 480 includes processor 482 and memory 484. In some embodiments, the on-premises controller 470 includes more than one processing circuit 480, processor 482, and memory 484, as shown in FIG. 4. The processor 482 may be a general purpose or specific purpose processor, an application specific integrated circuit (ASIC), one or more field programmable gate arrays (FPGAs), a group of processing components, or other suitable processing components. The processor 482 can be configured to execute computer code or instructions stored in memory 484 or received from other computer readable media (e.g., CDROM, network storage, a remote server, etc.).

Memory 484 may include one or more devices (e.g., memory units, memory devices, storage devices, or other computer-readable media) for storing data and/or computer code for completing and/or facilitating the various processes described in the present disclosure. Memory 484 may include random access memory (RAM), read-only memory (ROM), hard drive storage, temporary storage, non-volatile memory, flash memory, optical memory, or any other suitable memory for storing software objects and/or computer instructions. Memory 484 may include database components, object code components, script components, or any other type of information structure for supporting the various activities and information structures described in the present disclosure. Memory 484 may be communicably connected to processor(s) 482 via processing circuit 480 and may include computer code for executing (e.g., by processor 482) one or more processes described herein.

Memory 484 includes incident correlation circuit 490, response interpolation circuit 492, and data management circuit 494. The incident correlation circuit 490 can be configured to receive information from the data sources 460 of internal and external parameters indicating a real incident. As described herein, a "real" incident refers to an incident that is currently occurring, rather than a potential, "simulated" incident that is associated with a digital twin. For example, the incident correlation circuit 490 receives a notification from the electrical subsystem of building subsystems 120 at a site that electricity has been lost during a power outage. As yet another example, the incident correlation circuit 490 receives a notification from a third party service (e.g., a weather service) that a tornado alarm has been triggered for a surrounding area of a building site. In some embodiments, the incident correlation circuit 490 is configured to correlate the data received from the data sources 460 indicating a real incident with several combinations and permutations of the incident event. As such, when off-premises incident response platform 405 simulates potential incidents, known external and internal data parameters can be associated with the simulated potential incidents. In some embodiments, the incident correlation circuit 490 is configured to store a relationship between the event of the incident and the external and/or internal parameters received from the data sources 460 that indicated the real incident. For example, the incident correlation circuit 490 links a sensor reading of carbon dioxide above a set threshold with an incident of fire on-premises.

In various embodiments, the response interpolation circuit 492 is configured to retrieve information from the incident correlation circuit 490 regarding the real incident occurring on-premises and the correlated data of the incident. The response interpolation circuit 492 may also be configured to retrieve information from the response database 472 regarding the potential responses to a real incident with the lowest associated relative risks. In some embodiments, the response interpolation circuit 492 is configured to estimate instructions to control operation of one or more on-premises building devices to execute a selected response. For example, corrective actions may be estimated to implement a potential response based on known responses that were executed previously. As such, the response interpolation circuit 492 can be configured to determine an optimal response implementation plan for one of the building devices and/or building subsystems 120 to execute. In some embodiments, the response interpolation circuit 492 is configured to extrapolate outcomes of one or more potential responses to determine various control actions for implementing a response to a potential incident with the least amount of possible risks involved to entities of the building.

Data management circuit 494 is configured to manage new information received from the data sources 460 and determine whether the response database 472 may be out-of-sync from the response database 410 stored in the network 20. For example, if the network 20 goes down, the data management circuit 494 may store the time that a connection was last established with the network 20 and the time potential incidents and potential responses to each of the incidents were last received. In some embodiments, the data management circuit 494 also manages the available storage of response database 472. For example, the data management circuit 494 rewrites outdated memory in response to determining the available storage in response database 472 is below a threshold amount. The data management circuit 494 can also be configured to create timeseries data from the data sources 460 to transmit, via the communications interface 496, to the off-premises incident response platform 405.

Figure 5:
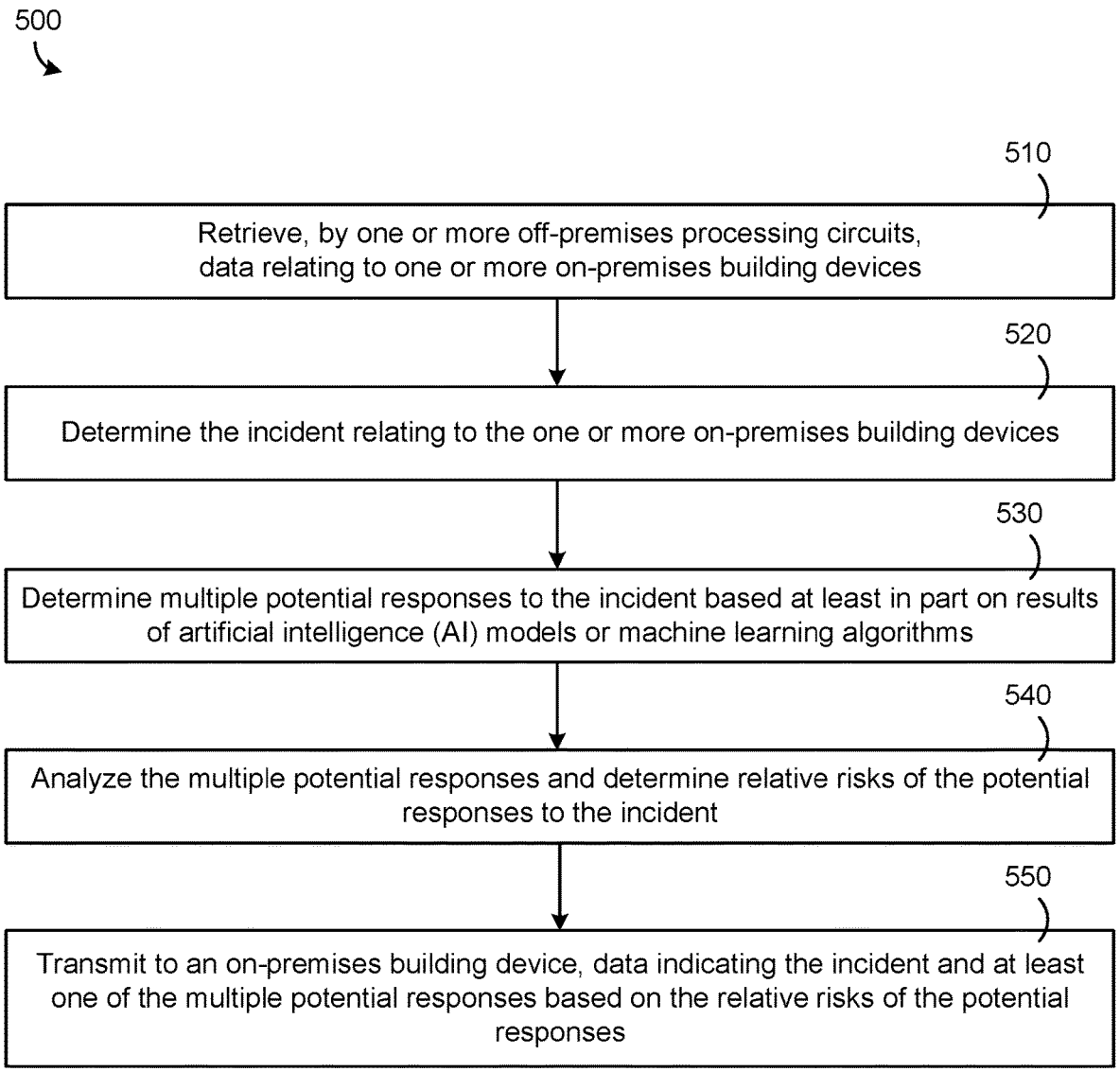
FIG. 5 is a flow diagram of a method of providing on-premises responses to a potential incident in a building, according to an exemplary embodiment.

Referring now to FIG. 5, a method 500 of providing on-premises response to an incident in a building is shown, according to an exemplary embodiment. In some embodiments, the incident response system 400 implements method 500. At step 510, the incident response system 400 retrieves data, by one or more off-premises processing circuits (e.g., processing circuit 420) relating to one or more on-premises building devices (e.g., devices of building subsystems 120, etc.). In some embodiments, the simulated and active incidents circuit 432 receives data regarding an on-premises building device from a DART 450 of the building device and/or a DART 450 of the building system that is associated with the device. The incident response system 400 may also retrieve data relating to on-premises systems (e.g., access control systems, a building management system, etc.) and applications (e.g., on-premises SAP, Oracle, MS Dynamics, etc.). For example, the incident response system 400 may retrieve data that indicates an application, such as an on-premises SAP, is corrupted by malware. Additionally, the incident response system 400 may receive data of the risk parameters associated with the one or more building devices at step 510. Further, the off-premises incident response platform 405, via the network 20, may receive a relative importance of various building devices to use in risk management. For example, the off-premises incident response platform 405 may receive from data sources 460 (e.g., a mobile device of a client), that a particular building device is a high-risk asset and/or a highly valued asset.

At step 520, the incident response system 400 determines an incident relating to the one or more on-premises building devices. The incident can be a potential incident, an incident that is developing, or an active incident, in some embodiments. For example, the simulated and active incidents circuit 432 generates a possible incident that is a threat to the one or more building devices based on data received from several DARTs 450 at various premises (i.e., sites), building management systems (e.g., BMS 102 of FIG. 1), etc. In some embodiments, the simulated and active incidents circuit 432 models potential incidents to other entities of the building, such as people, places, physical objects, equipment, and so on. For example, the simulated and active incidents circuit 432 may create a potential incident that is a threat to a large meeting of people for a district convention that includes the chief executive officer (CEO) of the client's company. As a further example, a potential incident to a visitor of a building that is physically impaired (e.g., has a hearing deficiency, is visually impaired, etc.) is a harmful injury, such as a fall from tripping on a flight of stairs or inability to exit as expected during a fire evacuation.

These potential responses can be determined by the incident response system 400 using analytics by one or more off-premises processing circuits (e.g., processing in a cloud-based computing system). In some embodiments, at step 520, the incident response system 400 determines a developing incident on-site at a building. For example, the incident response system 400 may determine an incident that is currently occurring on-premises, but is still developing. For example, an incident may be categorized as developing if the incident has been active for less than a predetermined amount of time. In some embodiments, an incident may be categorized as developing if the incident has not surpassed a safety threshold. For example, if weather data indicates early stages of a hurricane, such as a tropical disturbance or a tropical storm, the incident of a hurricane is categorized as developing by incident response platform 405. In another embodiment, the incident response system 400 determines an incident is active on-premises. For example, the incident response system 400 may receive a security alert from building subsystem 120 that an active threat has been detected on-premises. As another example, the incident response system 400 may determine an active incident of an earthquake based on weather data received from data sources 460 at step 510.

At step 530, the incident response system 400 determines multiple potential responses to the incident based at least in part on results of artificial intelligence (AI) models or machine learning algorithms. By using sophisticated AI predictive response models in off-premises devices (e.g., a cloud-based computing system), incident responses can be simulated in an economical manner. Further, on-premises devices (i.e., edge devices at a building site) may lack sufficient computing power to utilize the sophisticated AI models to determine several potential responses for incidents at multiple buildings. The incident response system 400 may rapidly determine optimized potential responses to incidents. These optimized, potential responses can then be used to quickly address a developing incident before it can affect a building and/or entities within the building.

In some embodiments, the incident analytics circuit 436 is configured to simulate several possible response scenarios to an incident relating to an entity of a building. For example, the incident analytics circuit 436 may determine a potential response to an armed robbery is to transmit to the security subsystem 130 to lock specific entrances and to instruct the electrical subsystem 126 to shut off power in areas of the building where the threat is located. As another example, a potential response to an incident event of a fire is to control operation of a sprinkler system of the fire safety subsystem 122, shut down auxiliary building devices that are not utilized in the fire safety subsystem 122, and transmit alerts to local authorities and a manager of the BMS 102 indicating a detected location of the source of the fire. An additional example includes an attempt to harm an entity (e.g., people, equipment) of the building. One response that is generated by the incident analytics circuit 436 may be to relocate the at-risk entity to a different area of the building. Another response simulated by the incident analytics circuit 436 may be to evacuate the at-risk entity from the building at a particular exit.

At step 540, the incident response system 400 analyzes the multiple potential responses and determines relative risks of the potential responses to the incident. In some embodiments, the incident analytics circuit 436 uses AI algorithms and machine-learning techniques to determine various potential responses and the outcomes of the potential responses. For example, the incident analytics circuit 436 may use techniques such as a k-means clustering algorithm, linear regression models, logistic regression models, Bayesian hierarchical models, neural networks/deep neural networks, and/or other methodologies to evaluate and select a potential response to an incident (e.g., with the lowest relative risk). In various embodiments, the incident analytics circuit 436 runs the AI and machine-learning algorithms on new data received from other components of the memory 424, such as risk management circuit 430, simulated and active incidents circuit 432, and/or incident correlation circuit 434. Therefore, the incident analytics circuit 436 can determine potential responses to incidents with the most recent data from internal and external parameters received by the off-premises incident response platform 405.

In some embodiments, the incident analytics circuit 436 is configured to output the potential response to each incident with a lowest relative risk to the response database 410. In other embodiments, the incident analytics circuit 436 outputs each of the potential responses to an incident with an associated risk (e.g., risk score) below a predetermined threshold. For example, each potential response with a risk category of "low to medium risk" or "none to low risk" are stored in the available storage of response database 410. As such, in response to the incident beginning to unfold, one or more on-premises devices (e.g., on-premises controller 470) can implement corrective actions using a selected potential response with the lowest associated risk. In some embodiments, the incident analytics circuit 436 is configured to output some or all potential responses together with their risk scores (e.g., without removing/filtering responses based on the risk scores).

At step 550, the incident response system 400 transmits data indicating the incident and at least one of the potential responses based on the relative risks of the potential response to an on-premises building device. For example, the off-premises incident response platform 405, via the network 20, synchronizes the potential responses stored within the response database 410 with the response database 472 of the on-premises controller 470. Thus, potential responses to one or more incidents may be continuously pushed to numerous building premises (i.e., sites) in real-time. The most updated potential responses and one or more potential incidents may be stored at one or more on-premises devices. For example, each of the potential responses to potential incidents may be stored at one or more edge devices on-premises. The potential responses received from the off-premises incident response platform 405 may then be available to the building devices on-site (e.g., on-premises controller 470) if connectivity to the network 20 is slow or all connectivity to network 20 is lost. As such, the data indicating an incident and potential responses may then be used by on-premises devices to address the incident in an event of loss of network connectivity. In some embodiments, loss of network connection occurs during or as a result of a developing incident. For example, if the network 20 is hacked during an incident, a response to decrease the negative effects of the incident may be to terminate connection of all on-premises devices with the network 20. However, the potential responses transmitted before the incident began may still be accessed by one of the on-premises building devices from memory storage (e.g., response database 472). By continuously synchronizing the most recent potential responses to various incidents the incident response system 400 permits immediate implementation of a response to an incident as the incident begins to develop at one or more sites.

Furthermore, updated synchronization of the most recent potential responses and the most recent incidents can allow a building system to use the most recent data received and stored to respond to an incident in the event of a power failure or connectivity failure. For example, if there is a power failure in building 10 and the connection to network 20 goes down, one or more potential responses to an incident can still be implemented by a building management system because the data regarding potential responses and potential incidents was stored locally at an on-premises device (e.g., on-premises controller 470). Additionally, continuous synchronization of the most recent potential response to various incidents can allow on-premises devices, such as on-premises controller 470, to obtain updated incident assessments as parameters that affect incidents change. In some embodiments, the on-premises devices may transmit conditions to off-premises incident response platform 405 and/or other off-premises devices connected to the network 20. The on-premises devices may then receive an updated, selected response to implement on-premises (e.g., by controlling operation of building devices). For example, an on-premises device (e.g., on-premises controller 470) may receive input from a client device on conditions for responding to potential incidents. Conditions may include settings regarding client preferences for responding to a developing incident. Conditions may include that a response event to an incident prioritizes the safety of people on-premises and minimizes damage to building property, as an example. After receiving conditions from an on-premises device or another source (e.g., client devices 40) via the network 20, the off-premises incident response platform 405 may determine a potential response to an incident to select as the best response to the incident if the incident develops.

In some embodiments, the incident response system 400 also transmits the data indicating one or more incidents and at least one of the potential responses based on relative risks of the potential response to user devices (e.g., client devices 40) at 550. For example, a client, via a respective client device 40, may receive data regarding multiple, different potential response to an incident. A client device 40 may also receive an associated risk level and/or risk score for each of the potential responses to the incident. In some embodiments, the off-premises incident response platform 405 transmits potential responses to client devices 40 for each of multiple potential incidents. In some embodiments, the off-premises incident response platform 405 transmits several potential responses to client devices 40 in response to a determination that a real, active incident has developed on-premises.

Additionally, the off-premises incident response platform 405 may receive condition data from devices, such as client devices 40 and/or another device on premise, that indicate conditions and/or assumptions behind the generated risk scores. This condition data may then be used by the off-premises incident response platform 405 late in responding to an incident if the incident begins occurring on-premises. For example, condition data may include that any determined risk to a specific asset on-premises automatically causes a response event to be associated with a risk score above a threshold level of acceptable risk. As another example, condition data may include an assumption that monetary value of some assets are not prioritized over safety of other assets (e.g., staff within a building). In some embodiments, condition data may include a ranked order of optimal, potential responses based on past incidents that already occurred. For example, in the event of a fire, condition data may include a preference for a certain exit to be used in response to the incident of fire. As yet another example, condition data may include a preference for a certain designated area (e.g., a safe room, a lockdown area, etc.) to be used in response to an incident of an active threat in the building. Therefore, a potential response to the incident of an active threat may then have a higher risk score associated with the potential response if access to the preferred designated area is not an option during that potential response.

In some embodiments, the potential responses to the one or more incidents are transmitted to one or more on-premises building devices (e.g., on-premises controller 470) asynchronously. For example, the potential responses may be transmitted when running AI models or machine learning algorithms results in an updated or new potential response to an incident. The potential responses to one or more simulated and/or active incidents can then be constantly refreshed and transmitted to on-premises devices. As such, the updated, potential responses can account for the most recent changes in data relating to an incident (e.g., weather data, social media data, etc.). These potential responses for incidents can then be re-downloaded by the on-premises devices (e.g., on-premises data stores, digital vault data graphs, on-premises controller 470, etc.) to be able to select an optimal response using edge-based computer processing on-site at a building. If connectivity to a data center or network is lost (e.g., because of an incident such as an earthquake, a fire, a flood, terrorist attack, etc.), the on-premises devices can still interpret an optimal response (e.g., response with the lowest associated risk) based on the potential responses that were most recently downloaded.

Figure 6:
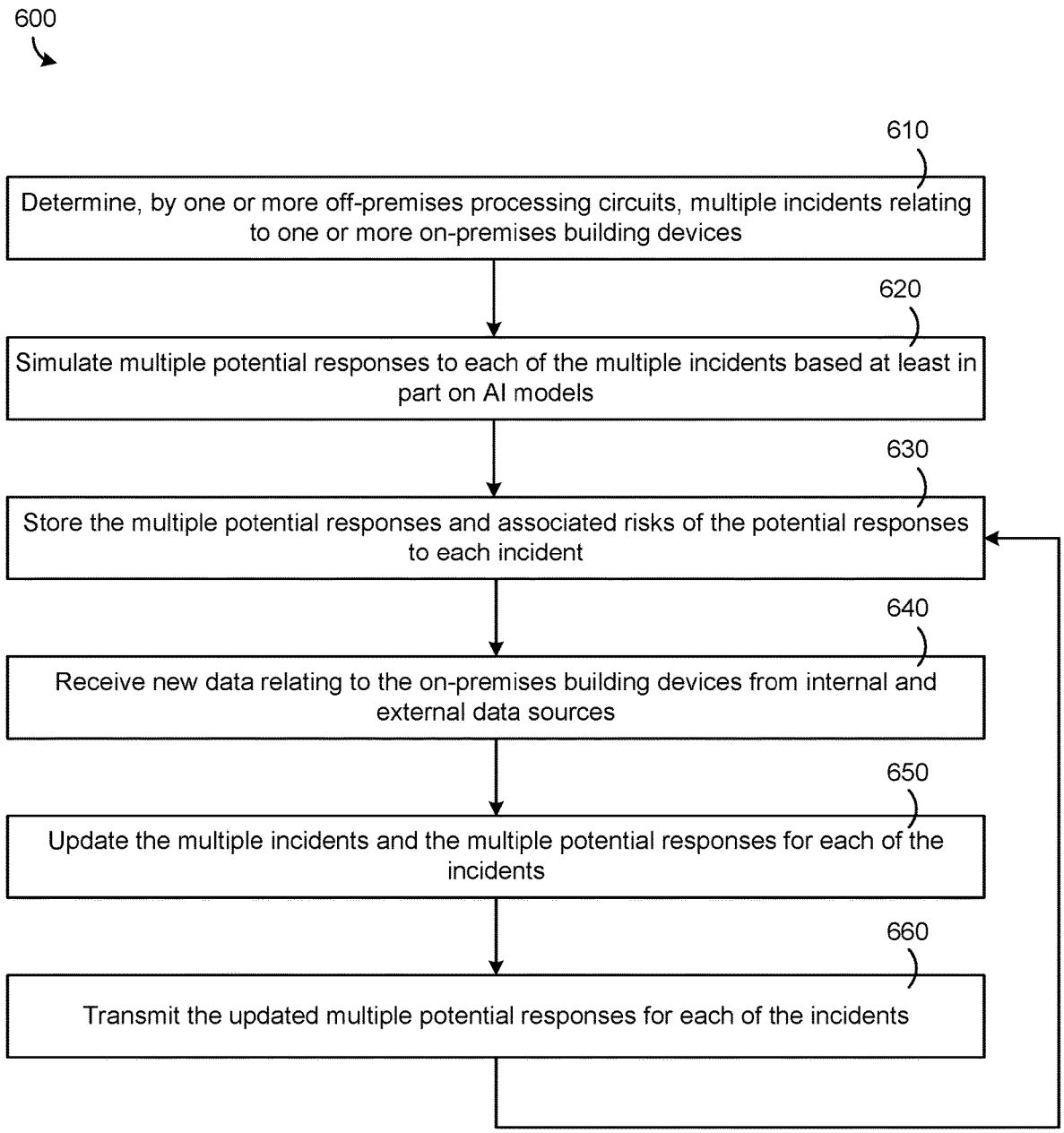
FIG. 6 is a flow diagram of a method of continuously modeling potential incidents and various potential responses to each of the potential incidents, according to an exemplary embodiment.

Referring now to FIG. 6, a method 600 demonstrating the continuous nature of modeling the incidents and various potential responses to each of the incidents is shown, according to an exemplary embodiment. In various embodiments, the incident response system 400 is configured to execute, at least in part, the method 600. In other embodiments, the operation of the steps of method 600 are executed in part by the cloud building management platform 140 of FIG. 1. In some embodiments, the method 600 executes at least part of method 500. For example, the method 600 determines several potential incidents relating to an on-premises building device, and for each potential incident, off-premises incident response platform 405 executes the steps of method 500 to determine potential responses for that particular one of several potential incidents.

In some embodiments, the incident response system 400 determines multiple incidents relating to building devices at step 610. For example, the simulated and active incidents circuit 432 may generate several incidents that may develop relating to a building device, such as a generator in the electrical subsystem 126 of a building site. One possible incident that may affect the generator is a power outage, while another potential incident that may be modeled by the simulated and active incidents circuit 432 is a device failure, for example. In various embodiments, the incident response system 400 determines several potential incidents relating to other entities (e.g., a router, a chiller, a controller, systems, applications, etc.) on-premises. For example, off-premises incident response platform 405 may model potential incidents to entities such as people, places on-premises, and other building assets (e.g., entities shown in entity graph 300 of FIGS. 3A and 3B). A potential incident may include any event that has a risk of causing harm or of being a threat to an entity on premise the site. In some embodiments, the simulated and active incidents circuit 432 determines an active incident relating to one or more on-premises building devices that is occurring on-site. For example, the simulated and active incidents circuit 432 may determine an active incident of a flood based on weather data received from data sources 460.

At step 620, the incident response system 400 simulates multiple potential responses to each of the multiple incidents based at least in part on results of AI models or machine learning algorithms. In some embodiments, step 620 executes step 530 of the method 500 for each of the modeled, incidents from step 610. The incident analytics circuit 436 may be configured to generate several possible responses to one of the incidents relating to an entity of a building. For example, for each of the several incidents, the incident analytics circuit 436 may run various, configured AI and machine-learning algorithms to model possible responses that may resolve or decrease likely risks of each incident. The incident analytics circuit 436 may also associate a risk level and/or score with each of the determined potential responses for an incident using data received from the risk management circuit 430.

At step 630, the incident response system 400 stores the multiple potential responses and associated risks of the potential responses to each incident. In some embodiments, the incident analytics circuit 436 is configured to transmit the generated potential responses for each of the incidents to be stored in an on-premises data store (e.g., the response database 410, a digital vault data graph), along with associated risks. Therefore, on-premises systems (e.g. an on-premises building management system) may interpolate the potential responses using less processing power as incidents begin to develop. In various embodiments, a subset of potential responses to an incident is stored in the response database 410. In some embodiments, the subset of potential responses is for a potential incident with a greater probability of occurring than other potential incidents. For example, only potential responses to ten percent of potential incidents most likely to occur are stored in the response database 410. As a further example, a subset of potential responses that have the lowest associated risks, ranked in comparison with other potential responses, are stored in the response database 410. In some embodiments, the risks of each potential response to the several incidents are stored in a graph that may be similar to the entity graph 300. As such, the incident response system 400 can be utilized to timely and efficiently respond to new, developing incidents to decrease potential losses and improve management of a site (e.g., a building site).

At step 640, the incident response system 400 receives new data relating to the on-premises building devices. The new data relating to the on-premises building devices may be from both internal and external data sources. The new data relating to the on-premises building devices may include internal data received from building devices and external data received from data sources outside of the building (e.g., third party services, user devices, etc.). In some embodiments, the on-premises controller 470 sends updated data from building subsystems 120 to the off-premises incident response platform 405. For example, a building device in the fire safety subsystem 122 detects an updated temperature level. The updated temperature level may then be used in determining new potential incidents, the probability of potential incidents developing, and/or potential risks associated with various potential responses to one of the incidents. In some embodiments, the data is transmitted in sets of timeseries data. For example, each set of timeseries data may include a series of values for the same point and a timestamp for each of the data values. A timeseries for a point provided by a temperature sensor can include a series of temperature values measured by the temperature sensor and the corresponding times at which the temperature values were measured. Timeseries may be generated by building subsystems 120, data sources 460, and/or a building management system (e.g., BMS 102). In some embodiments, the DARTs 450 use timeseries data received, via the network 20, to update the digital representation of the entity associated with the DART 450. An example of a timeseries which can be utilized by the off-premises incident response platform 405 and DARTs 450 is as follows:

[<key, timestamp1, value1>, <key, timestamp2, value2>, <key, timestamp3, value3>]

where key is an identifier of the source of the raw data samples (e.g., timeseries ID, sensor ID, device ID, etc.), timestamp$_i$ may identify the time at which the ith sample was collected, and value$_i$ may indicate the value of the ith sample.

At step 650, the incident response system 400 updates the multiple incidents and the multiple potential responses for each of the incidents. In some embodiments, this includes executing, at least in part, steps 610 and 620. In some embodiments, the simulated and active incidents circuit 432 generates updated potential incidents that are more likely to develop based on the updated information received from data sources 460. The simulated and active incidents circuit 432 may also update a statistic of the probability of a potential incident occurring based on the updated data received at step 640. For example, in response to retrieving updated data from a third party resource (e.g., a weather service) that the current wind speed is greater than a safety threshold (e.g., above 70 miles per hour (mph)), the simulated and active incidents circuit 432 may update a probability of a potential incident of a hurricane. The simulated and active incidents circuit 432 may update the probability to "very likely" or "above a 95% chance of incident," as an example.

At step 660, the incident response system 400 transmits the updated multiple potential responses for each of the incidents. In some embodiments, the incident analytics circuit 436 continuously sends, via the network 20, the information regarding the potential responses to each of the incidents to on-premises controller 470. The response database 472 may then constantly be synchronized with the response database 410 of the off-premises incident response platform 405. After transmitting the updated potential responses, method 600 may continue to step 630 and repeat the process as the updated potential responses get stored, new data is received, and the incidents and responses to the incidents change. Different embodiments of the ordering of steps of method 600 are also contemplated. For example, the method 600 may store the updated incidents and potential responses after they are updated (at step 650) and before the most recently updated, potential responses for each of the incidents are transmitted.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A method of providing on-premises response to an incident in a building, the method comprising:
   retrieving, by one or more off-premises processing circuits, data relating to one or more on-premises building devices of the building;
   determining, by the one or more off-premises processing circuits, the incident relating to the one or more on-premises building devices;
   determining, by the one or more off-premises processing circuits, a plurality of potential responses to the incident;
   analyzing, by the one or more off-premises processing circuits using the data, the plurality of potential responses and determining relative risks of the potential responses to the incident; and
   transmitting, by the one or more off-premises processing circuit to a first on-premises building device of the on-premises building devices, data indicating the incident and at least one of the plurality of potential responses based on the relative risks of the potential responses.

2. The method of claim 1, the method further comprising:
   determining, by the one or more off-premises processing circuits, a plurality of potential responses to a plurality of incidents;
   storing, by the one or more off-premises processing circuits, the potential responses and associated risks of the potential responses for each of the incidents;
   receiving, by the one or more off-premises processing circuits, new data relating to the one or more on-premises building devices;
   updating, by the one or more off-premises processing circuits, the plurality of incidents and plurality of potential responses for each of the incidents; and
   transmitting, by the one or more off-premises processing circuits to the first on-premises building device, data indicating the updated incidents and the updated potential responses for each of the incidents.

3. The method of claim 2, wherein the new data relating to the one or more on-premises building devices is based on both internal data received from building devices and external data received from data sources outside of the building.

4. The method of claim 1, wherein the data indicating the incident and at least one of the potential responses are transmitted to an on-premises building device in real-time.

5. The method of claim 1, wherein analyzing the plurality of potential responses and determining relative risks of the potential responses to the incident comprises processing the plurality of potential responses using one or more artificial intelligence (AI) models or machine learning algorithms.

6. The method of claim 1, wherein each of the potential responses are transmitted to the first on-premises building device with an associated risk.

7. The method of claim 1, further comprising selecting a subset of the potential responses based on an associated risk of each of the potential responses, wherein transmitting the at least one of the plurality of potential responses comprises transmitting the subset of potential responses.

8. The method of claim 7, wherein the associated risk of each of the potential responses comprises a risk score.

9. The method of claim 7, wherein the associated risk of each of the potential responses comprises a ranking in comparison to associated risks of other potential responses.

10. The method of claim 1, wherein at least one of the potential responses comprises instructions to control operation of the on-premises building devices.

11. The method of claim 1, wherein the incident is at least one of a potential incident, an incident that is developing, or an active incident.

12. The method of claim 1, wherein the at least one of the plurality of potential responses is usable by one or more on-premises devices to address the incident in an event of loss of network connectivity.

13. The method of claim 1, wherein the data indicating the incident and at least one of the potential responses are transmitted to the first on-premises building device asynchronously.

14. A system for providing on-premises response to an incident in a building, the system comprising:
   one or more computer-readable storage media having instructions stored thereon; and
   one or more off-premises processing circuits configured to execute the instructions to perform operations comprising:
   retrieving data relating to one or more on-premises building devices of the building;
   determining the incident relating to the one or more on-premises building devices;
   determining a plurality of potential responses to the incident;
   analyzing the plurality of potential responses and determining relative risks of the potential responses to the incident; and
   transmitting, to a first on-premises building device of the on-premises building devices, data indicating the incident and at least one of the plurality of potential responses based on the relative risks of the potential responses.

15. The system of claim 14, the one or more off-premises processing circuits further configured to:
   determine a plurality of potential responses to a plurality of incidents;
   store the potential responses and associated risks of the potential responses for each of the incidents;
   receive new data relating to the one or more on-premises building devices;
   update the plurality of incidents and plurality of potential responses for each of the incidents; and
   transmit, to the first on-premises building device, data indicating the updated incidents and the updated potential responses for each of the incidents.

16. The system of claim 14, wherein the new data relating to the one or more on-premises building devices is based on both internal data received from building devices and external data received from data sources outside of the building.

17. The system of claim 14, the one or more off-premises processing circuits configured to analyze the plurality of potential responses and determine relative risks of the potential responses to the incident by processing the plurality of potential responses using one or more artificial intelligence (AI) models or machine learning algorithms.

18. The system of claim 14, wherein each of the potential responses are transmitted to the first on-premises building device with an associated risk.

19. The system of claim 14, the one or more off-premises processing circuits configured to select a subset of the potential responses based on an associated risk of each of the potential responses and transmit the subset of the potential responses to the first on-premises device.

20. One or more computer-readable storage media having instructions stored thereon that, upon execution by one or more processing circuits, cause the one or more processing circuits to perform operations comprising:
   retrieving data relating to one or more on-premises building devices of the building;
   determining the incident relating to the one or more on-premises building devices;
   determining a plurality of potential responses to the incident;
   analyzing the plurality of potential responses and determining relative risks of the potential responses to the incident; and
   transmitting, to a first on-premises building device of the on-premises building devices, data indicating the incident and at least one of the plurality of potential responses based on the relative risks of the potential responses.

* * * * *